United States Patent [19]

Wolski

[11] Patent Number: 4,709,498
[45] Date of Patent: Dec. 1, 1987

[54] METHOD FOR MOUNTING SHRIMP

[76] Inventor: Frank Wolski, Poor Boys Fishin' Hole, P.O. Box 857, Coquille, Oreg. 97423

[21] Appl. No.: 915,413

[22] Filed: Oct. 6, 1986

[51] Int. Cl.⁴ ............................................. A01K 97/00
[52] U.S. Cl. ......................................................... 43/4
[58] Field of Search ................... 43/1, 4, 4.5; 223/103, 223/102; 66/116, 117

[56] References Cited

U.S. PATENT DOCUMENTS

| | | | |
|---|---|---|---|
| 2,526,104 | 10/1950 | Yamamoto | 223/102 |
| 2,741,409 | 4/1956 | Orthwine | 223/102 |
| 3,473,710 | 10/1969 | Lindquist | 223/102 |
| 4,559,734 | 12/1985 | Sauer | 43/4 |

FOREIGN PATENT DOCUMENTS 1493334  7/1967  France ...................... 43/4

Primary Examiner—Gene P. Crosby
Attorney, Agent, or Firm—Charles H. Thomas

[57] ABSTRACT

A bait threading tool is provided having a stainless steel shank, pointed at one end and defining a crook at the opposite end. To mount a shrimp as bait on the free end of a fishline, a short length of fishing leader line is utilized having a hook at one end and a loop at its opposite end. The loop is engaged in the crook of the bait threading tool and the shrimp is impaled on the point at the end of the shank. The bait threading tool is passed entirely through the body of the shrimp, carrying the loop of the fishing leader line therewith. The fishing leader is pulled until the hook is concealed in the body of the shrimp. The fishing leader loop is then disengaged from the crook and secured to the clip of a snap swivel at the end of the main fishline.

7 Claims, 4 Drawing Figures

2

METHOD FOR MOUNTING SHRIMP

BACKGROUND OF THE INVENTION

1. Field of the Invention

The present invention relates to a method and apparatus for mounting bait on the end of a fishline.

2. Description of the Prior Art

In fishing, both as a hobby and on a commercial basis, bait is routinely mounted on a hook secured to the end of a fishline wound about a reel. To catch some species of fish, shrimp are utilized as bait. The hook and shrimp are lowered into the water and the shrimp serves as bait to entice a fish to seize the shrimp, and thereby become snagged by the mouth on the hook. Typically, the hook is fastened by a knot at one end of a short fishing leader line and a loop is tied in the opposite end of the leader line. A snap swivel having a releasable clip is attached to the free end of the main fishing line and the loop of the leader line may be releasably engaged in the catch of the snap swivel clip. The use of leader lines allows different sizes of hooks to be easily mounted on the free end of the main fishing line. Also, the use of fishing leaders facilitates replacement of hooks which may become lost or snagged.

One problem which has persisted in utilizing live fishing bait, such as shrimp, is the difficulty in securely fastening the bait onto a hook. In conventional practice the barb of the hook is placed through the body of the bait, such as a shrimp, and the shrimp is held on means of the hook. However, it is well known that such a conventional manner of attachment is relatively insecure. When bait, particularly a relatively massive bait such as a shrimp, is secured to a hook only by engagement of the barb of the hook through the bait, the bait frequently tears loose upon the application of only a slight force, since the flesh of the shrimp is relatively weak when the hook is pulled laterally thereagainst. Oftentimes a fisherman is unaware that the bait has been lost from his hook, and will spend fruitless periods of time fishing with an unbaited hook. Many fishermen, cognizant of the likelihood that bait is likely to become dislodged from their hooks, frequently draw their baited hooks to the surface of the water to check to be sure that the bait is still in place. This technique, while certainly justifiable so as to avoid fishing with an unbaited hook, results in repeated stress upon the flesh of the bait where the barb of the hook is engaged. This aggravates the already acute problem of lost bait. As a result, conventional live bait fishing techniques involve a significant loss of bait due to the inadequate methods of attachment of bait to hooks.

SUMMARY OF THE INVENTION

In one broad aspect the present invention may be considered to be a bait threading tool comprised of a length of rigid wire defining a straight shank, a point at one end of the shank and a crook at the opposite end of the shank. The wire is preferably constructed of stainless steel between about 0.031 and about 0.035 inches in diameter and having a length overall of about four inches. In another broad aspect the invention may be considered to be a method of mounting shrimp as bait on a hook at one end of a length of fishing leader line utilizing a fishline and the threading tool of the invention. The method of the invention comprises forming a loop in the length of fishing leader line opposite the hook and engaging the loop in the crook of the threading tool. A shrimp or other bait is then impaled on the pointed end of the threading tool, and the threading tool is passed completely through the body of the shrimp, thereby pulling the loop therewith. The leader line is then drawn into the body of the shrimp until the hook reaches the body. At this point the loop will have passed entirely through the body of the shrimp, and can be disengaged from the crook of the threading tool and attached to the free end of the fishline. Preferably, the head of the shrimp is impaled and the threading tool is passed lengthwise beneath the carapace of the shrimp to exit from the tail of the shrimp. The leader line thereby extends lengthwise through the body of the shrimp, and the hook of the leader line is embedded in the bait. As a result, the bait is attached to a leader line far more securely than has previously been possible.

By utilizing the device and method of the invention, bait may be attached to fishline far more securely and with a greatly reduced likelihood of being lost or detached then has heretofor been possible. Unlike standard methods of mounting shrimp as bait on hooks, the invention avoids a situation where the hook is engaged in the shrimp in such a fashion that force between the fishline and the hook tends to pull the barb of the hook laterally outwardly from the body of the shrimp. To the contrary, according to the invention, force between the fishline and shrimp is transmitted lengthwise through the body of the shrimp, thus greatly increasing the resistance to forces tending to pull the shrimp off of the hook. This longitudinal application of force is possible because the fishing leader line extends lengthwise through the body of the shrimp, not laterally outwardly therefrom.

While the bait threading tool of the invention is particulary configured to secure a shrimp as bait on the end of a fishline, the invention is equally applicable to other types of bait which is of elongated configuration, such as worms, small bait fish, eels and slugs. The invention may be described with greater clarity and particularity by reference to the accompanying drawings.

DESCRIPTION OF THE EMBODIMENT AND IMPLEMENTATION OF THE METHOD

Figure 1:
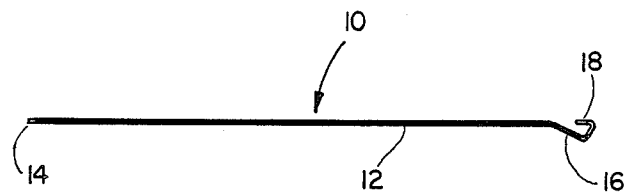
FIG. 1 is a plan view of a preferred embodiment of the bait threading tool of the invention.

FIG. 1 illustrates a bait threading tool 10 according to the invention. The bail threading tool 10 is formed of length of rigid wire, preferably constructed of stainless steel between about 0.031 and about 0.035 inches in diameter. The rigid length of wire of the bait threading tool 10 forms a straight shank 12 at one end of which a point 14 is defined, and at the opposite end of which a crook 16 is defined.

It should be noted that the tip 18 of the crook 16 is axially aligned with the shank 12 so as to minimize the likelihood that the crook 16 will become snagged within the body of a shrimp when the threading tool 10 is utilized according to the method of the invention. The same anti-snagging effect may be achieved by forming the crook almost as a closed circle with only a narrow opening through which the thickness of the fishing leader loop can pass, or as a "pigtail". The threading tool 10 is preferably constructed of a length of wire measuring about four inches prior to permanent deformation to form the crook 16. Once the wire has been deformed to form the crook 16, the overall length of the threading tool 10 is about three and five-eighths inches. The point 14 and the shank 12 extend a length of about three and seven-eighths inches.

Figure 2:
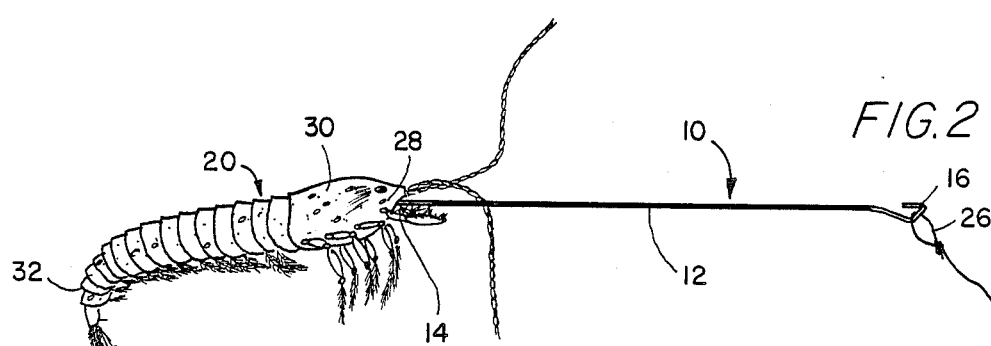
FIG. 2 illustrates the manner in which a shrimp is impaled as bait according to the invention.
Figure 3:
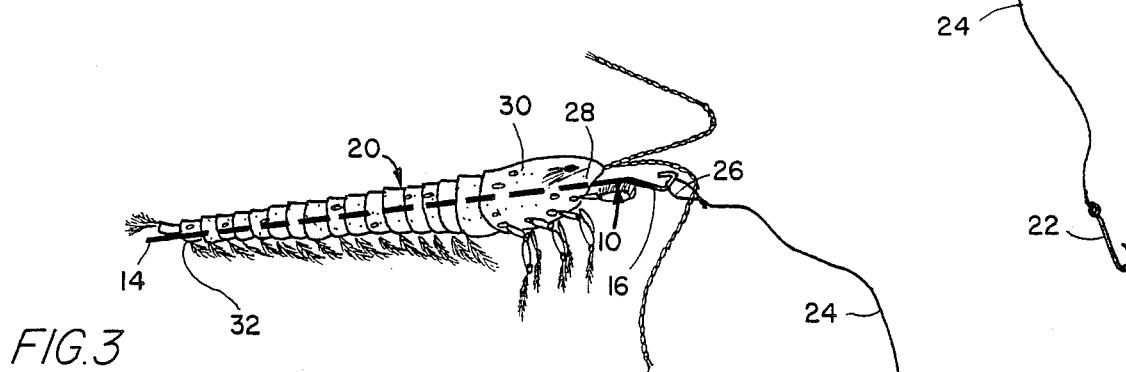
FIG. 3 illustrates the manner in which the bait threading tool of FIG. 1 is employed to mount a shrimp as bait on a fishing leader.
Figure 4:
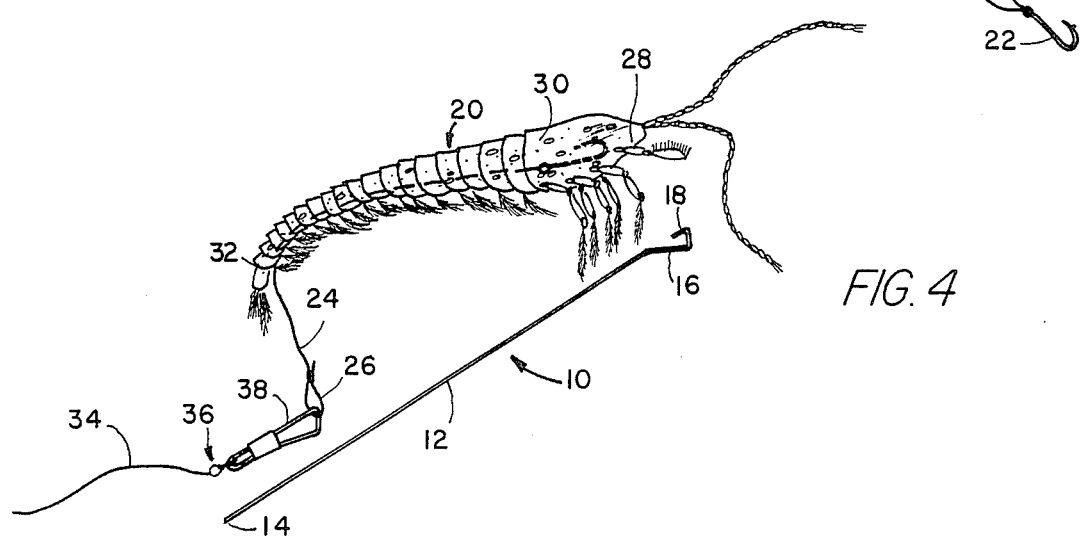
FIG. 4 illustrates the manner in which a shrimp is mounted as bait on a fishing leader at the completion of the procedure according to the invention.

FIGS. 2-4 illustrates the manner in which the bait threading tool 10 of the invention is utilized to mount a shrimp 20 as bait on a hook 22 which is secured by a tied knot to one end of a length of fishing leader line 24. According to the invention, a loop 26 is first tied in the length of fishing line 24 opposite the hook 22. As illustrated in FIG. 2, the loop 26 is releasably engaged on the crook 16 of the bait threading tool 10. The shrimp 20 is then impaled on the pointed end 14 of the threading tool 10. Preferably, the shrimp 20 is impaled through the head 28, with the point 14 being inserted into the mouth of the shrimp. The shank 12 of the bait threading tool 10 is then passed lengthwise longitudinally through the body of the shrimp 20 and beneath the carapace 30 to exit from the tail 32 in the manner illustrated in FIG. 3. When the point 14 of the bait threading tool 10 emerges from the tail 32, the threading tool 10 is pulled longitudinally, completely through the body of the shrimp 20 until the crook 16 follows the point 14 and the shank 20, and also emerges from the tail 32 of the shrimp 20. Because the loop 26 is engaged on the crook 16, the loop 26 of the fishing leader line 24 is likewise pulled into the body of the shrimp 20. The loop 26 travels with the crook 16 and is pulled completely through the body of the shrimp 20, entering the shrimp at the head 28 and emerging from the tail 32, as illustrated in FIG. 4.

The fishing leader line 24 is pulled longitudinally until the hook 22 reaches the body of the shrimp 20. Preferably, tension on the fishing leader 24 is exerted until the hook is lodged within and concealed in the body of the shrimp 20 in the manner depicted in FIG. 4. The fishing leader line 24 is long enough so that the loop 26 is located totally outside of the body of the shrimp, emerging at the tail 32 thereof. The loop 26 is easily disengaged from the crook 16. Preferably, the free end of the main fishline 34 terminates in a snap swivel 36 having a clip 38. The clasp of the clip 38 is opened and the loop 26 is engaged thereon. The clasp of the clip 38 is then closed, thereby securing the fishing leader line 24 thereto.

As illustrated in FIG. 4, the shrimp 20 is securely mounted upon the fishing leader line 24. Axial force exerted between the main fishline 34 and the shrimp 20 acts longitudinally through the body of the shrimp 20, not laterally relative thereto. As a consequence, the shrimp 20 is far less likely to become dislodged from the hook 22 and the fishing leader line 24, as contrasted with conventional bait fishing practices. Although any type of hook may be used, the system works best with double or treble hooks.

Undoubtedly, numerous variations and modifications of the invention will become readily apparent to those familiar with fishing techniques and equipment. For example, while the implementation of the method of the invention described herein explains a manner of mounting a shrimp utilizing the tool of the invention, the bait threading tool of the invention may be employed with equal advantage for mounting other types of elongated bait, such as worms. Accordingly, the scope of the invention should not be construed as limited to the specific embodiment and the manner of implementation described herein, but rather is defined in the claims appended hereto.

I claim:

1. A method of mounting shrimp as bait on a hook located at the end of a length of fishing leader line utilizing a fishline having a free end and a threading tool formed of a rigid wire pointed at one end, having a straight shank, and defining a crook at the opposite end, comprising: forming a loop in said length of fishing leader line opposite said hook, engaging said loop on said crook of said threading tool, impaling a shrimp on said pointed end of said threading tool, passing said threading tool completely through the body of said shrimp, thereby pulling said loop therewith, drawing said leader line into said body of said shrimp until said hook reaches said body, disengaging said loop from said crook, and attaching said loop to said free end of said fishline.

2. A method according to claim 1 further comprising impaling said shrimp at the head thereof and passing said threading tool lengthwise beneath the carapace to exit from the tail of said shrimp.

3. A method according to claim 1 further comprising pulling said hook into the body of said shrimp.

4. A method according to claim 1 wherein a leader clip is fastened to said free end of said fishline, and said loop is attached to said leader clip.

5. A method according to claim 1 further comprising impaling said body of said shrimp at the head thereof and passing said threading tool longitudinally through said body of said shrimp and withdrawing said threading tool from the tail of said shrimp.

6. A method according to claim 1 further comprising lodging said hook in said body of said shrimp.

7. In a method of mounting shrimp as bait on a fishline utilizing a fishing leader having a hook at one end and a loop at an opposite end, the improvement comprising fashioning a threading tool of rigid wire having a shank pointed at one end and having a crook at its opposite end, engaging said loop of said fishing leader on said crook, impaling a shrimp with said pointed end of said threading tool, passing said threading tool entirely through the body of said shrimp, pulling on said fishing leader until said hook reaches said body of said shrimp, disengaging said loop from said crook, and securing said loop of said fishing leader to said fishline.

* * * * *